United States Patent
Beniakar et al.

(10) Patent No.: US 12,015,314 B2
(45) Date of Patent: Jun. 18, 2024

(54) CONTROL AND DRIVE OF A ROTATING MACHINE WITH AN INNER AND AN OUTER STATOR

(71) Applicant: ABB Schweiz AG, Baden (CH)

(72) Inventors: Minos Beniakar, Athens (GR); Luca Peretti, Järfälla (SE)

(73) Assignee: ABB Schweiz AG, Baden (CH)

( * ) Notice: Subject to any disclaimer, the term of this patent is extended or adjusted under 35 U.S.C. 154(b) by 761 days.

(21) Appl. No.: 16/979,395

(22) PCT Filed: Mar. 6, 2019

(86) PCT No.: PCT/EP2019/055497
§ 371 (c)(1),
(2) Date: Sep. 9, 2020

(87) PCT Pub. No.: WO2019/174981
PCT Pub. Date: Sep. 19, 2019

(65) Prior Publication Data
US 2021/0075302 A1  Mar. 11, 2021

(30) Foreign Application Priority Data
Mar. 12, 2018 (EP) .................... 18161190

(51) Int. Cl.
*H02P 1/00* (2006.01)
*H02K 11/33* (2016.01)
(Continued)

(52) U.S. Cl.
CPC ............. *H02K 16/04* (2013.01); *H02K 11/33* (2016.01)

(58) Field of Classification Search
CPC ................... H02K 16/04; H02K 11/33
(Continued)

(56) References Cited

U.S. PATENT DOCUMENTS

| | | | |
|---|---|---|---|
| 6,429,554 B1* | 8/2002 | Albrich | H02P 6/005 310/179 |
| 2004/0021437 A1* | 2/2004 | Maslov | H02K 1/141 318/400.01 |

(Continued)

FOREIGN PATENT DOCUMENTS

| | | |
|---|---|---|
| CN | 104811112 A | 7/2015 |
| EP | 1978632 A1 | 10/2008 |

(Continued)

OTHER PUBLICATIONS

PCT International Search Report & Written Opinion of the International Searching Authority; Application No. PCT / EP2019/ 055497; Completed: May 15, 2019; dated May 27, 2019; 10 Pages.

(Continued)

*Primary Examiner* — Erick D Glass
(74) *Attorney, Agent, or Firm* — Whitmyer IP Group LLC (57) ABSTRACT

A method for continuous operation of a rotating machine, the method is performed in a rotating machine having an inner stator and an outer stator. The method includes setting a rotating machine reference operational value for the whole rotating machine, obtaining operational parameters for the inner stator and for the outer stator, wherein the operational parameters include magnetic cross-coupling between the inner and outer stators, determining an inner stator reference operational value for the inner stator and an outer stator reference operational value for the outer stator based on the set rotating machine reference operational value for the whole rotating machine and the obtained operational parameters, and driving the rotating machine based on the determined inner stator reference operational value for the inner stator and on the determined outer stator reference operational value for the outer stator, wherein the determined inner stator reference operational value for the inner stator (Continued)

differs from the determined outer stator reference operational value for the outer stator.

15 Claims, 6 Drawing Sheets

(51) Int. Cl.
*H02K 16/04* (2006.01)
*H02P 3/00* (2006.01)
*H02P 7/00* (2016.01)

(58) Field of Classification Search
USPC .......................................................... 318/494
See application file for complete search history.

(56) References Cited

U.S. PATENT DOCUMENTS

| | | | |
|---|---|---|---|
| 2008/0246425 A1 | 10/2008 | Atarashi | |
| 2014/0291987 A1 | 10/2014 | Dooley | |
| 2015/0288264 A1* | 10/2015 | Tojima | H02P 25/08 |
| | | | 310/46 |
| 2015/0303857 A1 | 10/2015 | Burke | |
| 2016/0009185 A1 | 1/2016 | Sonoda et al. | |

FOREIGN PATENT DOCUMENTS

| | | |
|---|---|---|
| EP | 2019473 A1 | 1/2009 |
| EP | 2264874 A2 | 12/2010 |
| EP | 2945266 A1 | 11/2015 |
| JP | 07131961 A | 5/1995 |
| JP | 2002095300 A | 3/2002 |
| JP | 2007195387 A | 8/2007 |
| JP | 2016189647 A | 11/2016 |
| WO | 2005112230 A1 | 11/2005 |
| WO | 2014109218 A1 | 7/2014 |
| WO | 2016051250 A2 | 4/2016 |

OTHER PUBLICATIONS

Japanese Office Action; Application No. 2020-546394; Completed: Oct. 20, 2021; dated Oct. 26, 2021; 19 Pages.
Chinese Office Action; Application No. 2019800169218; dated Apr. 25, 2022; 10 Pages.
International Preliminary Report on Patentability; Application No. PCT/EP2019/055497; dated Sep. 15, 2020; 8 Pages.
European Office Action; Application No. 18 161 190.6; dated Nov. 9, 2020; 7 Pages.
Korean Office Action; Application No. 10-2020-7025570; dated Aug. 25, 2023; 19 Pages.
Japanese Office Action: Application No. JP2020-546394: Completed: Mar. 4, 2024; Mailing Date: Mar. 5, 2024; 14 Pages.

* cited by examiner

CONTROL AND DRIVE OF A ROTATING MACHINE WITH AN INNER AND AN OUTER STATOR

TECHNICAL FIELD

The invention relates to a method and control and drive system for continuous operation of a rotating machine having an inner stator and an outer stator.

BACKGROUND

One major challenge for wind generators and electrical propulsion/traction machines is to increase the power and torque density in order to save space and weight. Typical electrical machines used today have a single rotor and a single stator. The rotor can be either encapsulated by and rotating inside a single outer stator or encapsulating and rotating outside of a single inner stator, such as in in-wheel motors.

The double stator machine concept is based on an electrical machine with two (instead of one) radial flux stator cores placed within each other, an outer and an inner one. Between these two stators rotates a rotor due to the torque produced in double air gaps, which thus significantly increases the torque and power density with comparison to standard single air-gap machines. The double stator machine can be synchronous or asynchronous, which implies that the rotor could possibly comprise permanent magnets, bars, excitation winding(s) and/or magnetic anisotropy (e.g. some kind of reluctance rotor). The majority of double stator machines encountered in the literature are permanent magnet machines.

Figure 1:
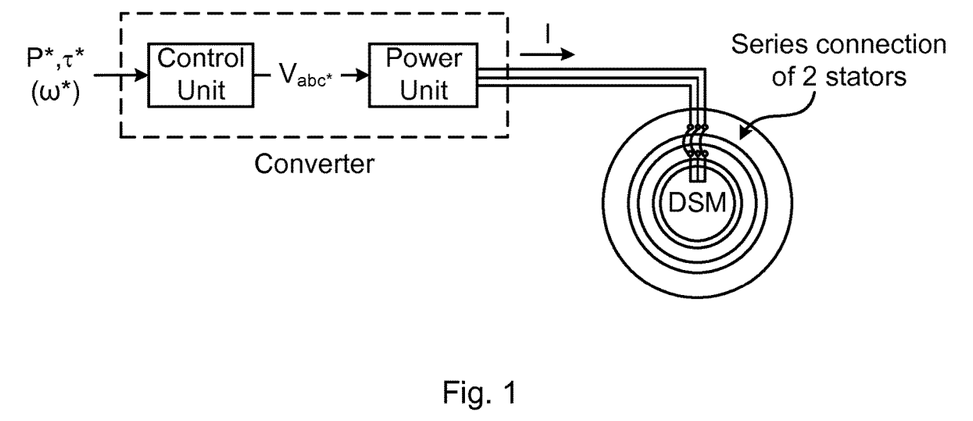
FIG. 1 schematically illustrates a double stator machine drive system with a series connection of stator windings.
Figure 2:
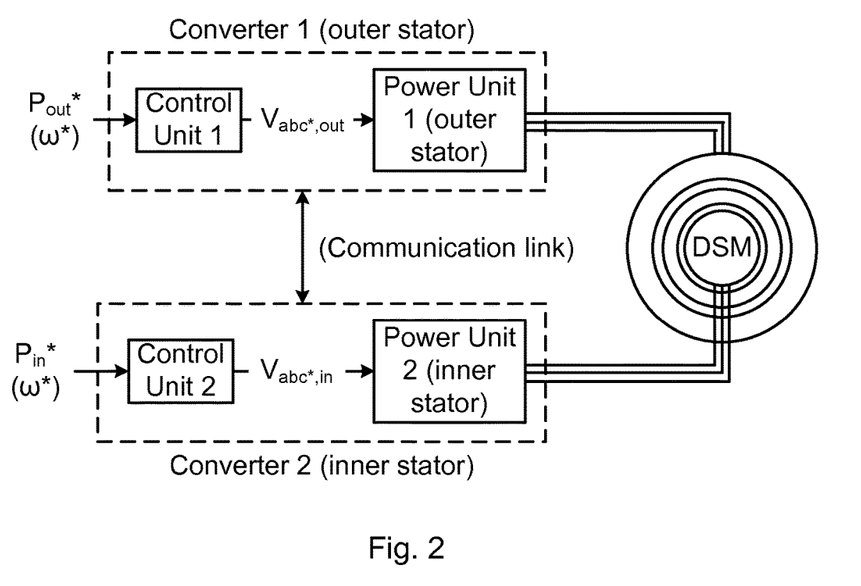
FIG. 2 schematically illustrates a double stator machine drive system with a separated stator control configuration.

The double stator concept has already been investigated for different applications, mainly in the automobile and wind power industry. Drive system and/or the control of such machines are however not much considered. Two different configurations are shown in FIGS. 1 and 2. In FIG. 1 a single converter drives and controls a two-stator machine, wherein the two stators are in series connection. The converter receives a reference power or reference torque for the two-stator machine, and comprises a control unit creating a reference voltage to a power unit for the two-stator machine. In FIG. 2 two separate converters drive and control an outer stator and an inner stator, respectively. A communication link goes from the outer stator converter to the inner stator converter. The outer stator converter receives a reference power or torque for the outer stator, and comprises a control unit creating a reference voltage for a power unit for the outer stator. The inner stator converter receives a reference power or torque for the inner stator, and comprises a control unit creating a reference voltage for a power unit for the inner stator.

US 2004/0021431 discloses an adaptive architecture for electric motors, generators and other electric machines.

SUMMARY

An object of the present invention is to enable the multiple degrees of freedom available in controlling an electrical machine having an outer and an inner stator.

According to a first aspect there is presented a method for continuous operation of a rotating machine. The method is performed in a rotating machine having an inner stator and an outer stator. The method comprises setting a rotating machine reference operational value for the whole rotating machine, obtaining operational parameters for the inner stator and for the outer stator, wherein the operational parameters include magnetic cross-coupling between the inner and outer stators, determining an inner stator reference operational value for the inner stator and an outer stator reference operational value for the outer stator based on the set rotating machine reference operational value for the whole rotating machine and the obtained operational parameters, and driving the rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

The inner stator may be driven by a power unit separately from a power unit for the outer stator.

The rotating machine, inner stator and outer stator reference operational values may be for one of the following: power, torque and speed.

The operational parameters for the inner and outer stators may further comprise one or more of the following: rotation position, inductance, flux linkage, magnetic coupling, current component, current position, resistance, loss variation and temperature dependence.

The operational parameters may be obtained by measurements and/or table look-up.

The inner stator reference operational value for the inner stator may comprise individually set values for direct current and for quadrature current, and the outer stator reference operational value for the outer stator may comprise individually set values for direct current and quadrature current.

According to a second aspect there is presented a control and drive system for a rotating machine having an inner stator and an outer stator. The control and drive system comprises a controller device for a rotating machine, configured to set a rotating machine reference operational value for the whole rotating machine, to obtain operational parameters for an inner stator and for an outer stator of the rotating machine, wherein the operational parameters includes cross-coupling between the inner and outer stators, and to determine an inner stator reference operational value for the inner stator and an outer stator reference operational value for the outer stator based on the set rotating machine reference operational value for the whole rotating machine and the obtained operational parameters, and a power device arranged to drive rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

The power device may comprise a first power unit for the inner stator and a separate second power unit for the outer stator, wherein the inner stator is driven separately from the outer stator.

The controller device may comprise a first control unit for the inner stator and a separate second control unit for the outer stator, wherein the inner stator is driven separately from the outer stator.

The rotating machine, inner stator and outer stator reference operational values may be for one of the following: power, torque and speed.

The operational parameters for the inner and outer stators may further comprise one or more of the following: rotation position, inductance, flux linkage, magnetic coupling, current component, current position, resistance, loss variation and temperature dependence.

The operational parameters may be obtained by measurements and/or table look-up.

The inner stator reference operational value for the inner stator may comprise individually set values for direct current and for quadrature current, and the outer stator reference operational value for the outer stator may comprise individually set values for direct current and quadrature current.

According to a third aspect there is presented a computer program for continuous operation of a rotating machine having an inner stator and an outer stator. The computer program comprises computer program code which, when run on a controller, causes the controller to set a rotating machine reference operational value for a whole rotating machine, obtain operational parameters for an inner stator and for an outer stator of the rotating machine, wherein the operational parameters include cross-coupling between the inner and outer stators, to determine an inner stator reference operational value for the inner stator and an outer stator reference operational value for the outer stator based on the set rotating machine reference operational value for the whole rotating machine and the obtained operational parameters, and to drive the rotating machine based on the inner stator determined reference operational value for the inner stator and on the outer stator determined reference operational value for the outer stator, wherein the determined inner stator reference operational value for the inner stator differs from the determined outer stator reference operational value for the outer stator.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The architecture of US 2004/0021431 is based on separating the stator into coaxially arranged, isolated electromagnetic circuits, allowing for separate control to each independent circuit. In that sense, when an independent segment is controlled, the remaining segments are not taken into account by its controller. The windings are totally isolated to eliminate any coupling and consequently any cross-inductances. The present invention presents a control method where the electromagnetic coupling of the stators is taken into account and common or hierarchical control for the two stators is employed.

Known solutions for a double stator drive system are typically based on either separated control or series connection of the two stators, thus removing inherent degrees of freedom from a system that naturally allows for the control of four current components ($I_{dq}$ for each stator). Configurations that allow for additional degrees of freedom, by introducing common or hierarchical control for the two stators, are presented. The presented solutions apply for both series and parallel flux machine topologies. Additionally, the presented control applies for any type of synchronous, asynchronous or reluctance rotor type of double stator machines (for example, surface mounted, interior or spoke type permanent magnet, with flux barriers etc).

Figure 3:
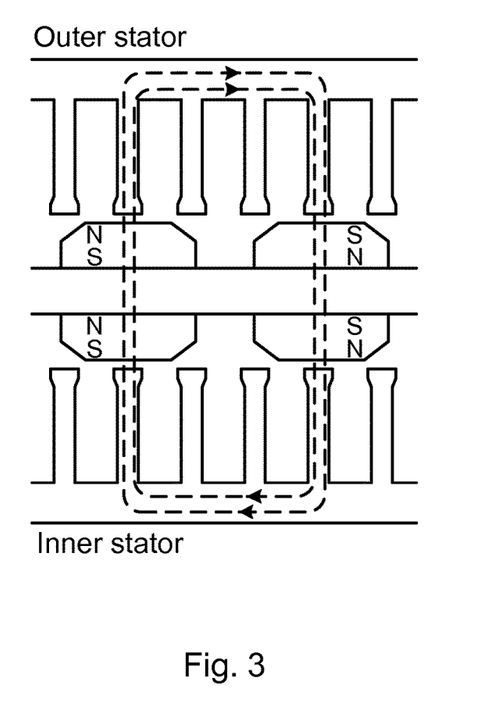
FIG. 3 schematically illustrates a double stator machine topology with a series flux concept for a surface mounted permanent magnet rotor type.
Figure 4:
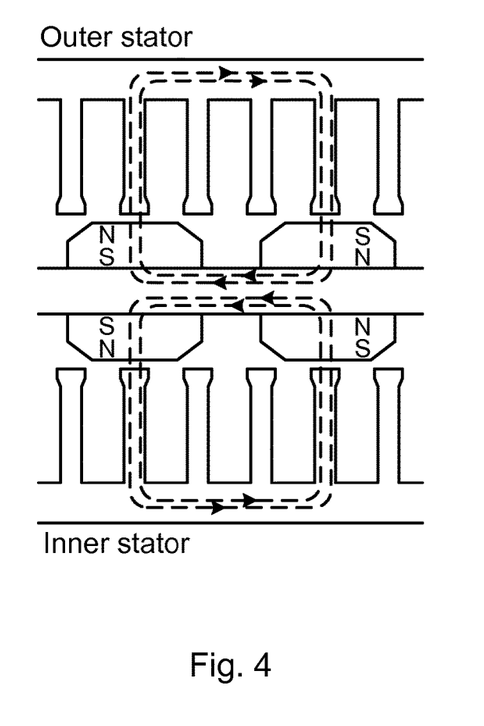
FIG. 4 schematically illustrates a double stator machine topology with a parallel flux concept for a surface mounted permanent magnet rotor type.

A double stator machine topology with a series flux concept is illustrated in FIG. 3, and a double stator machine topology with a parallel flux concept is illustrated in FIG. 4. For the second alternative, a parallel-flux configuration can be used to guarantee the magnetic de-coupling of the outer and inner stators, as shown in FIG. 4. In this way, each stator can be controlled independently and the overall system is equivalent to a system with two machines mounted on a common shaft, so mechanically coupled. A magnetically-coupled series-flux configuration could also be used, as long as the drives are able to communicate to each other about the magnetic operating point in each stator, since the knowledge of the actual flux linkages in both stators, and thus of the inductances in both stators, leads to different regulation actions.

A series connection of the stator windings phases can work for both flux guidance alternatives, series or parallel, but in each case a different inductance matrix for the equivalent machine will occur. A phase S of the inner stator may be connected in series with phase S of the outer stator, etc.

A global control solution is presented that incorporates the regulation problem of the two stators of a rotating machine at once. Such a solution allows for a 4-degree of freedom system that can take into consideration the cross-coupling between stators and its effect on the respective flux linkages, torque/power components and/or losses (copper, iron, permanent magnet if present and/or mechanical) utilizing a calculated or measured four-dimensional flux linkage map when four current components ($I_{dq}$ for each stator) are the input and four flux linkages are the output ($\lambda_{dq}$ for each stator), or a five-dimensional flux linkage map when the rotation position is also added as another input to the map.

Figure 5:
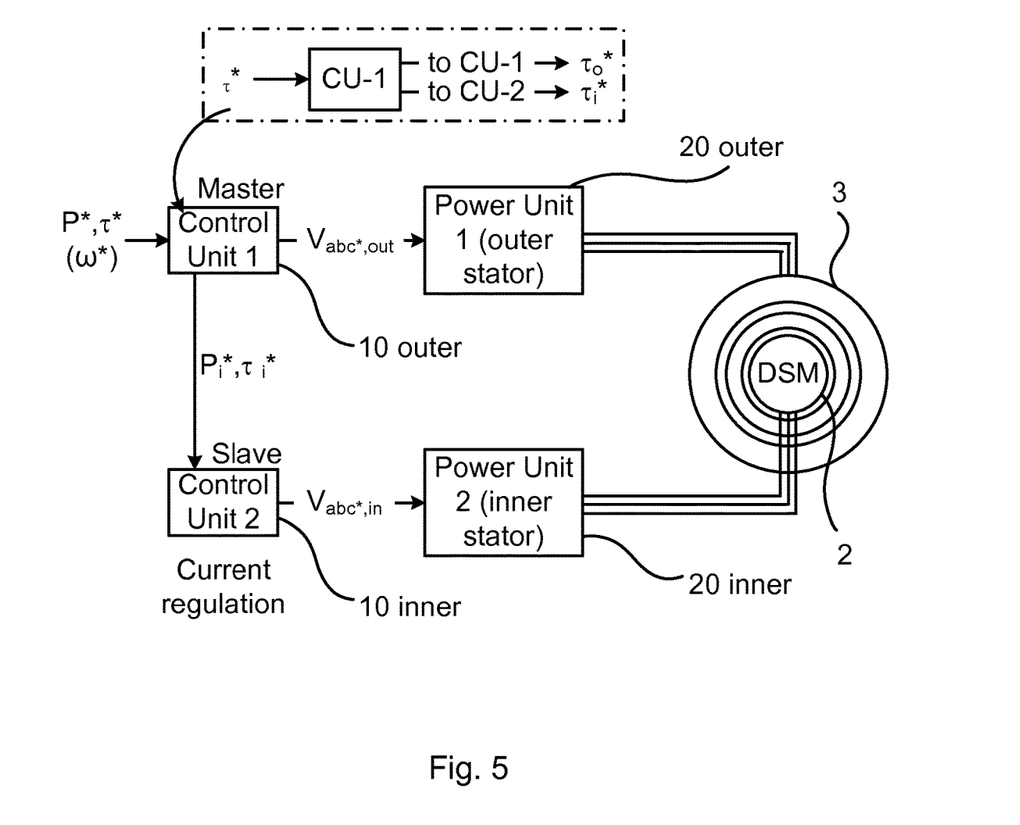
FIG. 5 schematically illustrates a double stator drive configuration involving independent power units with a master/slave type control.
Figure 6:
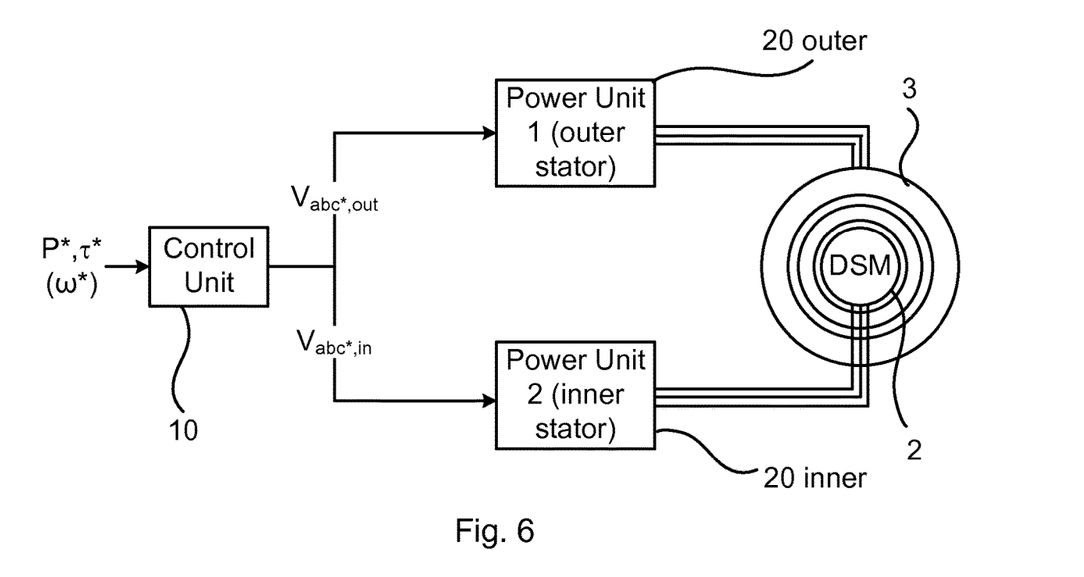
FIG. 6 schematically illustrates a double stator drive configuration involving independent power units with a common controller.

Two alternative realizations of a drive system comprising two separate power units are shown in FIGS. 5 and 6. Independent power units from conventional converters are used, one for each stator. The power units may be two, three or more level converters, and low, medium or high voltage converters. An example is a three-level, low-voltage converter with a voltage of, for example, up to 1 kV.

FIG. 5 illustrates the first global control solution implemented as a master/slave configuration of the control and drive system. The master controller is responsible for the generation of the reference torque/power signals for each stator, based on a pre-defined torque or power split strategy. This split strategy is defined in the master control unit. Based on a rotating machine reference value for the whole rotating machine, P* or τ*, the control unit 10 outer obtains operational parameters for the inner and outer stators, respectively, and determines a reference operational value for each respective stator, i.e. an inner stator and an outer stator reference operational value, respectively, e.g. $\tau_i^*$ and $\tau_o^*$. The split of the rotating machine reference operational values within the master control unit is illustrated within dash dot lines, wherein the outer stator reference operational value for the outer stator is handled within the master control unit and the inner stator reference operational value for the inner stator is transferred to the slave control unit. In FIG. 5, the master control unit 10 outer is also the controller for the outer stator 3, while the slave control unit 10 inner is responsible for the inner stator 2. However, a configuration where the master is responsible for the inner stator, and the slave is responsible for the outer stator, is also possible. The master sends to the slave the required information for performing a torque or current regulation, for example an inner-stator power reference $P_i^*$ or an inner-stator torque reference $\tau_i^*$. After the split information is calculated and sent, the current regulation takes place in both control units 10 and e.g. PWM voltages $V_{abc^*, in}$ and $V_{abc^*, out}$ for the inner and outer stator are generated, and the power unit 20 outer for the outer stator and the power unit 20 inner for the inner stator creates the voltages sent as references, respectively.

FIG. 6 illustrates the second global control solution implemented as a centralized, common-control drive system with only one control unit 10 for two separate power units 20 inner and 20 outer. All control operations, including the torque or power split, the current regulations etc., are performed in the common control unit 10. Based on a rotating machine reference value for the whole rotating machine, P* or τ*, the control unit 10 obtains operational parameters for the inner and outer stators, respectively, and determines a reference operational value for each respective stator, i.e. an inner stator and outer stator reference operational value, respectively, e.g. $\tau_i^*$ and $\tau_o^*$. The control unit 10 uses the determined reference operational values for the power unit 20 outer and power unit 20 inner, respectively, e.g. generating PWM voltages $V_{abc^*, in}$ and $V_{abc^*, out}$ for the inner and outer stator, respectively.

By means of such a global control solution, the implementation of various control and optimum torque or power split strategies is enabled. Examples of possible strategies are the well-known maximum-torque-per-ampere (MTPA), maximum-torque-per-voltage (MTPV) and, additionally, Maximum Efficiency Control (MEC) or, equivalently, Maximum Torque Per Losses (MTPL), Nominal Power Split (NPS), Nominal Torque Split (NTS). In broader terms, any control strategy that involves an optimal selection of the powers, torques, or of the four current components $I_{dq\ inner}$ and $I_{dq\ outer}$ of the two stators while optimizing a certain criterion, can be implemented.

The main difference with respect to the application of the same control strategies for the two stators as separate entities is that the whole machine is considered at once. A simple example is hereby described with reference to an MTPA strategy, which allows for the minimization of the copper losses. If such a strategy is applied, for example merely to the inner stator, a certain torque or power is produced by the inner stator while the minimization of its copper losses is achieved. However, this does not necessarily mean that the minimization of the whole machine copper losses has been achieved. It could be possible that the same torque and power produced by the outer stator would result in lower copper losses in the outer stator itself. Thus, the use of the global control is to analyse and decide which fraction of torque or power should be produced by the two separate stators, in order to minimize the sum of the copper losses of the inner and the outer stator. Similar considerations apply to other control strategies.

The machine losses (copper, iron, permanent magnet etc) may be calculated by either analytical expressions or by calculated/measured look-up tables. Potential temperature dependency of some electrical parameter components (for example the stator resistance) can be taken into account by introducing the temperature as an additional control input, provided that winding temperature measurements are available. Additionally, the dependency of certain loss components on the rotating speed can be considered in a similar manner, when implementing a loss-calculation or loss-estimation based control.

Figure 7:
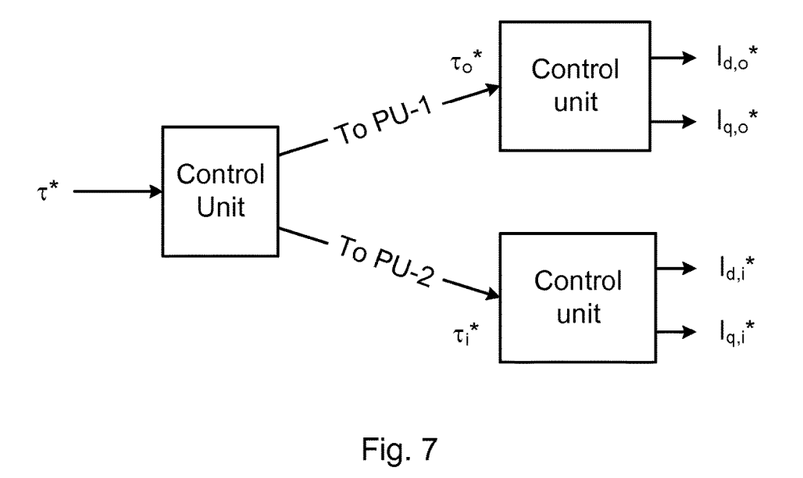
FIG. 7 schematically illustrates double stator drive system basic control blocks with a torque/power split for master/slave control.
Figure 8:
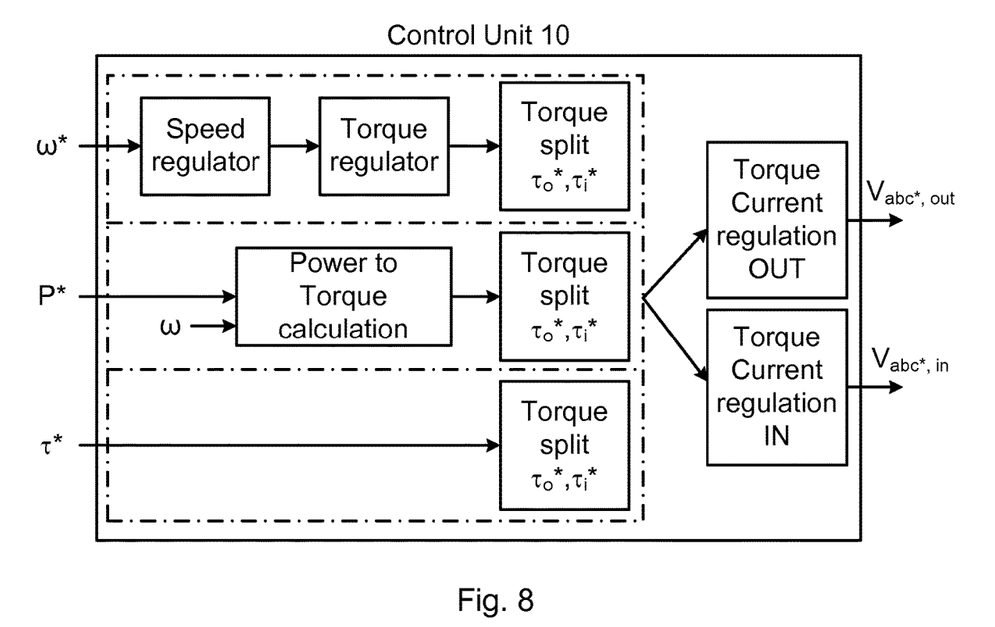
FIG. 8 schematically illustrates double stator drive system basic control blocks with centralized controller detailed functions.
Figure 9:
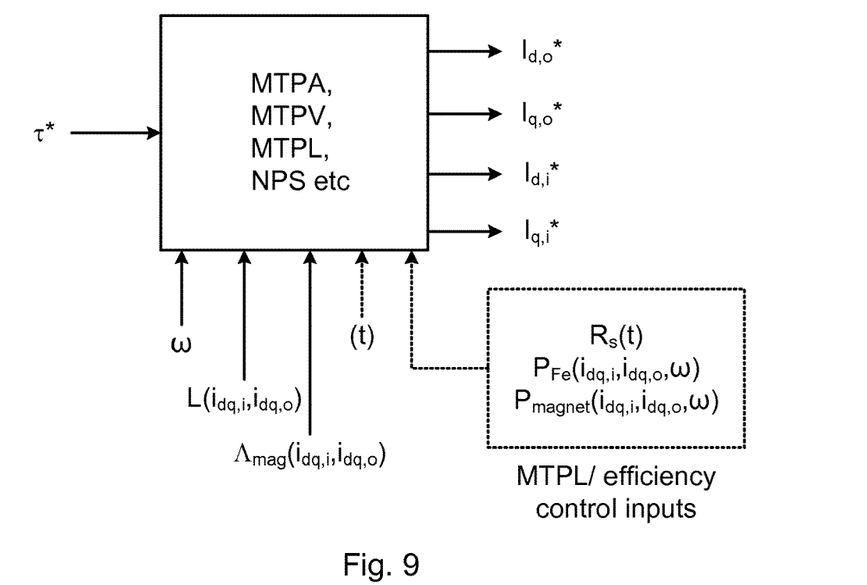
FIG. 9 schematically illustrates double stator drive system basic control blocks with centralized controller main block that implements the torque split with input signals.

FIG. 7 depicts a simplified schematic of the torque/power split procedure for the master/slave control solution. The master control unit receives a global rotating machine reference torque value. The master control unit splits the global rotating machine reference torque value into an outer outer stator reference torque value for use by a control unit and power unit for the outer stator, and into an inner inner stator reference torque value for use by a control unit and power unit for the inner stator. FIGS. 8 and 9 illustrate the respective procedure for the case of a global or centralized controller. FIG. 8 shows the alternative options in case there is an incoming speed, power or torque reference. FIG. 9 shows a basic control block, indicating some possible control strategies and highlighting possible control inputs. In particular, the four-dimensional or five-dimensional flux linkage and torque or power representations, with respect to the current components and position, and stator resistance values need to be provided at least for MTPA and MTPV control. Additional information, such as loss variations and temperature dependencies may be used for more sophisticated control schemes. The possible control inputs are not limited to the aforementioned ones and are dependent on the implemented control strategy. In order to acquire the required flux, torque, power or other parameter mapping usually look-up tables are used, based on calculated, estimated or measured quantities. Additionally, alternative surrogate models, for example a polynomial or other type of approximation, or a neural network, which can provide an accurate representation of the required mapping could be utilized.

Figure 10:
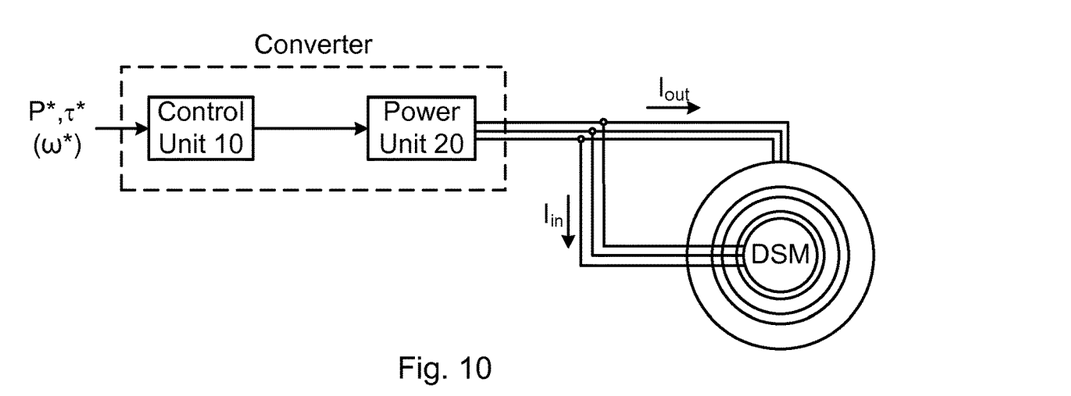
FIG. 10 schematically illustrates a double stator machine drive system topology with parallel stator connection to a single converter.
Figure 11:
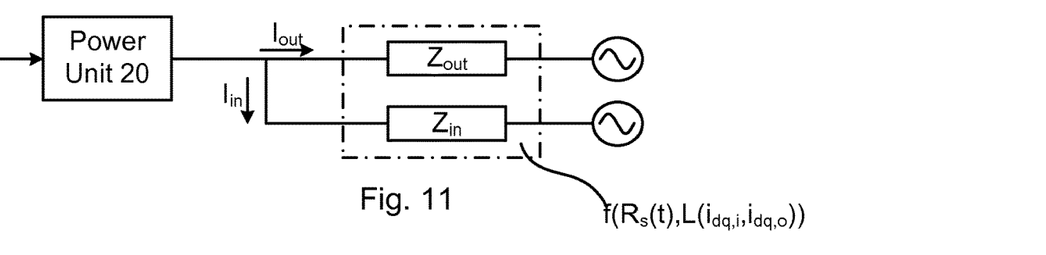
FIG. 11 schematically illustrates an equivalent impedance model of FIG. 10.

Another drive system possibility is the parallel connection of the two stator windings driven by one converter, as shown in FIG. 10. In this case, the currents feeding each stator are defined merely by the equivalent impedance of each stator, as illustrated in FIG. 11, which means that the current split is defined by the winding configuration and magnetic circuit geometry of each stator. The winding configuration (wire diameter and length, number of parallel branches, etc.) defines the armature resistance and the magnetic circuit design defines the inductances (and inductance variations). In this case the machine design is strongly connected with the drive system. The control unit 10 still needs to split the operational values for the inner and outer stator, respectively, but the alternatives are less since the currents to the inner and outer stator are coupled to each other.

Figure 12:
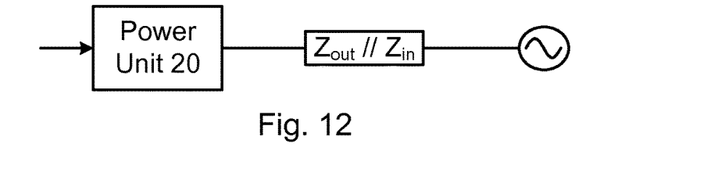
FIG. 12 schematically illustrates a simplified equivalent impedance model shown in FIG. 11.

FIG. 12 illustrates a simplified equivalent impedance of FIG. 11, as seen by the converter.

The use of a global control system for both stators simultaneous of the electrical machine, allows for a four-degree or five-degree of freedom control system. In this way the optimum current components that minimize a specific objective criterion may be identified for the whole electrical machine and not only of its separate inner and outer stators.

The increased power and torque density of the double-stator system is beneficial for applications where the power per volume is a key parameter.

In e.g. wind power applications the higher power density leads to a smaller nacelle size for a given power rating, which simplifies the mechanical tower and nacelle construction. For e.g. marine propulsion a reduction in volume reduces the drag in the water.

The presented solutions may thus advantageously be used for e.g. large machines in wind generators and marine propulsion but may also be used for smaller electrical machines as in automotive traction applications and industrial applications.

Another advantage of the double stator concept has a better fault tolerance with respect to inverter failure or one stator winding failure. Under these conditions it is possible to continue the operation at reduced power until a service is available. This is especially important for off-shore wind power or marine propulsion where a continuous operation is very important and a quick service response is not always possible.

Additionally, the partial load operation of the double stator concept is superior compared to partial load conditions for single stator machines due to the possibility to share the power production by both stator cores and thus achieve better efficiency operating points for each stator. This is indeed enabled by the use of global control strategies, which are better suited for achieving optimal partial load operation, efficiency and fault-tolerance.

Finally, it has to be noted that global control strategies achieve the minimization of a control-specific criterion on a machine system level, by considering both the stators at once. This is realized through the consideration of all four current components as state variables in a single optimization problem and is the only way to identify the respective global optimums.

Figure 13:
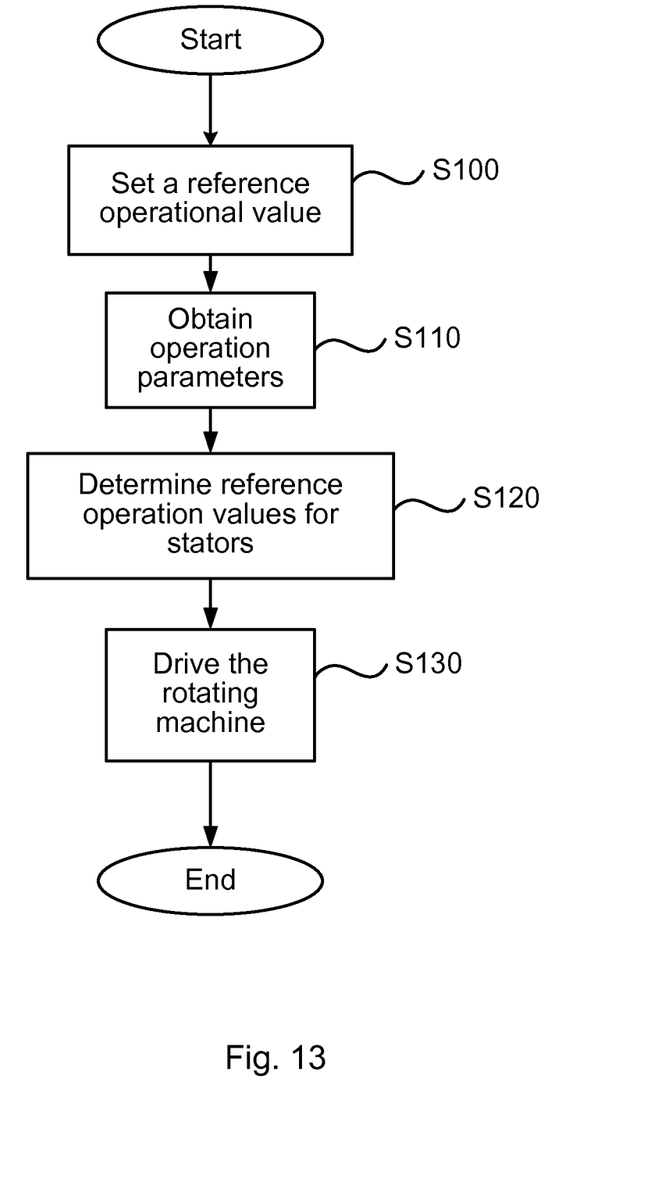
FIG. 13 is a flow chart schematically illustrating a method presented herein.

A method for continuous operation of a rotating machine having an inner stator and an outer stator is presented with reference to FIG. 13. The method is performed in a rotating machine having an inner stator and an outer stator, and comprises:

setting S100 a first reference operational value for the rotating machine;

obtaining S110 operational parameters for the inner stator and for the outer stator, wherein the operational parameters include magnetic cross-coupling between the inner and outer stators;

determining S120 an inner stator reference operational value for the inner stator and an outer stator reference operational value for the outer stator based on the set rotating machine reference operational value for the whole rotating machine and the obtained operational parameters; and driving S130 the rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

The inner stator may be driven separately from the outer stator.

The rotating machine, inner stator and outer stator reference operational values may be for one of the following: power, torque and speed.

The operational parameters for the inner and outer stators may further comprise one or more of the following: rotation position, inductance, flux linkage, magnetic coupling, current component, current position, resistance, loss variation and temperature dependence.

The operational parameters may be obtained by measurements and/or table look-up. Look-up tables may e.g. be estimated or calculated using simulation tools or analytic models.

The inner stator reference operational value for the inner stator may comprise individually set values for direct current and for quadrature current, and the outer stator reference operational value for the outer stator may comprise individually set values for direct current and quadrature current.

A control and drive system for a rotating machine having an inner stator 2 and an outer stator 3 is presented with reference to FIG. 5, 6 or 10. The control and drive system comprises:

a controller device 10 for a rotating machine, configured to set a rotating machine reference operational value for the whole rotating machine, to obtain operational parameters for an inner stator and for an outer stator of the rotating machine, wherein the operational parameters includes magnetic cross-coupling between the inner and outer stators, and to determine an inner stator reference operational value for the inner stator and an outer stator reference operational value for the outer stator based on the set rotating machine reference operational value for the whole rotating machine and the obtained operational parameters; and a power device 20 arranged to drive rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

The power device may comprise a first power unit 20 inner for the inner stator and a separate second power unit 20 outer for the outer stator, wherein the inner stator is driven separately from the outer stator.

The controller device may comprise a first control unit 10 inner for the inner stator and a separate second control unit 10 outer for the outer stator, wherein the inner stator is controlled separately from the outer stator.

The rotating machine, inner stator and outer stator reference operational values may be for one of the following: power, torque and speed.

The operational parameters for the inner and outer stators may further comprise one or more of the following: rotation position, inductance, flux linkage, magnetic coupling, current component, current position, resistance, loss variation and temperature dependence.

The operational parameters may be obtained by measurements and/or table look-up.

The inner stator reference operational value for the inner stator may comprise individually set values for direct current and for quadrature current, and the outer stator reference operational value for the outer stator comprises individually set values for direct current and quadrature current.

A computer program for continuous operation of a rotating machine having an inner stator and an outer stator is presented with reference to FIG. 13. The computer program comprises computer program code which, when run on the controller, causes the controller to:
- set S100 a rotating machine reference operational value for a whole rotating machine;
- obtain S110 operational parameters for an inner stator and for an outer stator of the rotating machine, wherein the operational parameters include cross-coupling between the inner and outer stators;
- determine S120 an inner stator reference operational value for the inner stator and an outer stator reference operational value for the outer stator based on the set rotating machine reference operational value for the whole rotating machine and the obtained operational parameters; and
- drive S130 the rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

A computer program product comprising a computer program and a computer readable storage means on which the computer program is stored is also presented.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for continuous operation of a rotating machine, the method being performed in a rotating machine having an inner stator and an outer stator, comprising:
    setting a rotating machine reference operational value for the whole rotating machine;
    obtaining operational parameters for the inner stator and for the outer stator, wherein the operational parameters include magnetic cross-coupling between the inner and outer stators;
    determining an inner stator reference operational value for the inner stator and an outer stator reference operational value for the outer stator based on the set rotating machine reference operational value for the whole rotating machine and the obtained operational parameters; and
    driving the rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

2. The method according to claim 1, wherein the inner stator is driven by a power unit independently from a power unit for the outer stator.

3. The method according to claim 1, wherein the rotating machine, inner stator and outer stator reference operational values are for one of the following: power, torque and speed.

4. The method according to claim 1, wherein the operational parameters for the inner and outer stators further includes one or more of the following: rotation position, inductance, flux linkage, magnetic coupling, current component, current position, resistance, loss variation and temperature dependence.

5. The method according to claim 1, wherein the operational parameters are obtained by measurements and/or table look-up.

6. The method according to claim 1, wherein the inner stator reference operational value for the inner stator comprises individually set values for direct current and for quadrature current, and the outer stator reference operational value for the outer stator includes individually set values for direct current and quadrature current.

7. A control and drive system for a rotating machine having an inner stator and an outer stator, the control and drive system comprising:
    a controller device for a rotating machine, configured to set a rotating machine reference operational value for the whole rotating machine, to obtain operational parameters for an inner stator and for an outer stator of the rotating machine, wherein the operational parameters includes cross-coupling between the inner and outer stators, and to determine an inner stator reference operational value for the inner stator and an outer stator reference operational value for the outer stator based on the set rotating machine reference operational value for the whole rotating machine and the obtained operational parameters; and
    a power device arranged to drive the rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

8. The control and drive system according to claim 7, wherein the power device comprises a first power unit for the inner stator and a separate second power unit for the outer stator, wherein the inner stator is driven independently from the outer stator.

9. The control and drive system according to claim 7, wherein the controller device comprises a first control unit for the inner stator and a separate second control unit for the outer stator, wherein the inner stator is driven separately from the outer stator.

10. The control and drive system according to claim 7, wherein the rotating machine, inner stator and outer stator reference operational values are for one of the following: power, torque and speed.

11. The control and drive system according to claim 7, wherein the operational parameters for the inner and outer stators further includes one or more of the following: rotation position, inductance, flux linkage, magnetic coupling, current component, current position, resistance, loss variation and temperature dependence.

12. The control and drive system according to claim 7, wherein the operational parameters are obtained by measurements and/or table look up.

13. The control and drive system according to claim 7, wherein the inner stator reference operational value for the inner stator comprises individually set values for direct current and for quadrature current, and the outer stator reference operational value for the outer stator includes individually set values for direct current and quadrature current.

14. A computer program for continuous operation of a rotating machine having an inner stator and an outer stator, the computer program comprising computer program code which, when run on a controller, causes the controller to:
　set a rotating machine reference operational value for a whole rotating machine;
　obtain operational parameters for an inner stator and for an outer stator of the rotating machine, wherein the operational parameters include cross-coupling between the inner and outer stators;
　determine an inner stator reference operational value for the inner stator and an outer stator reference operational value for the outer stator based on the set rotating machine reference operational value for the whole rotating machine and the obtained operational parameters; and
　drive the rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

15. A computer program product comprising a computer program which generates controller signals to:
　set a rotating machine reference operational value for a whole rotating machine;
　obtain operational parameters for an inner stator and for an outer stator of the rotating machine, wherein the operational parameters include cross-coupling between the inner and outer stators;
　determine an inner stator reference operational value for the inner stator and an outer stator reference operational value for the outer stator based on the set rotating machine reference operational value for the whole rotating machine and the obtained operational parameters; and
　drive the rotating machine based on the determined inner stator reference operational value for the inner stator and on the determined outer stator reference operational value for the outer stator, wherein the determined inner stator reference operational value for the inner stator differs from the determined outer stator reference operational value for the outer stator.

* * * * *